United States Patent [19]
Armand

[11] Patent Number: 5,272,811
[45] Date of Patent: Dec. 28, 1993

[54] HYDRAULICALLY CONTROLLED SELF-CONTAINED MULTIFUNCTIONAL TOOL SUCH AS SHEARS/SEPARATOR

[75] Inventor: Michel Armand, Rhône, France
[73] Assignee: Hydr'Am, France
[21] Appl. No.: 900,182
[22] Filed: Jun. 17, 1992

[30] Foreign Application Priority Data

Jun. 20, 1991 [FR] France ............... 91 07837

[51] Int. Cl.⁵ .............. B26B 15/00; B26B 7/00; B21J 9/12
[52] U.S. Cl. ..................... 30/228; 72/453.15
[58] Field of Search ............. 30/228, 272, 245; 72/416, 407, 453.15, 453.03, 453.16

[56] References Cited

U.S. PATENT DOCUMENTS

| | | | |
|---|---|---|---|
| 2,343,595 | 3/1944 | Van Sittert | 72/453.15 |
| 3,693,254 | 9/1972 | Salonen | 30/228 |
| 3,765,087 | 10/1973 | Pawloski | 30/228 |
| 4,181,003 | 1/1980 | Kononov et al. | 72/453.03 |
| 4,458,418 | 7/1984 | McSmith | 30/228 |
| 4,644,648 | 2/1987 | Pellenc | 30/228 |
| 4,890,474 | 1/1990 | Agostini et al. | |
| 4,998,351 | 3/1991 | Hartmeister | 30/228 |

FOREIGN PATENT DOCUMENTS

| | | |
|---|---|---|
| 0235403 | 9/1987 | European Pat. Off. |
| 0274710 | 12/1987 | European Pat. Off. |
| 0389716 | 10/1990 | European Pat. Off. |
| 0409753 | 1/1991 | European Pat. Off. |
| 2623738 | 6/1989 | France |
| 2644383 | 9/1990 | France |

Primary Examiner—Frank T. Yost
Assistant Examiner—Paul M. Heyrana
Attorney, Agent, or Firm—Wall and Roehrig

[57] ABSTRACT

A hydraulically controlled self-contained multi-functional hand tool including a hydraulic ram portion with a rod that activates two blades or arms. The blades articulate about a common pin and are mounted on a fork joint which is securely fixed to the body of the ram. Opening and closing of the blades is achieved by means of a system of links controlled directly by the rod associated with the hydraulic ram. The movement of the blades is obtained by means of an assembly which is integrated into the body of the tool. Said assembly includes an electric motor powered by a battery; drive means for compressing a fluid contained within a leak-tight chamber, and a flexible membrane arranged in the chamber to compensate for fluid volume differences and to prevent formation of a vacuum in the chamber when fluid is moved to activate the tool. The compressed fluid is transferred by a directional control valve and feeder assembly within a reversible circuit which allows the fluid to act on either of two faces of a piston that controls the rod connected to the ram for activating the two blades or arms forming the tool. The assembly thus provided permits operation of the tool in a reversible manner while maintaining the same efficiency in both working directions.

5 Claims, 3 Drawing Sheets

HYDRAULICALLY CONTROLLED SELF-CONTAINED MULTIFUNCTIONAL TOOL SUCH AS SHEARS/SEPARATOR

BACKGROUND OF THE INVENTION

1. Field of the Invention

The present invention relates to an improvement brought to hydraulically controlled tools, comprising two active members capable of being moved apart from each other and brought together, such as for example shears or separating systems used especially in order to achieve the dismantling of insulations, make cutouts in sheets of metal of appreciable thickness, such as for example in the bodywork of a vehicle which has been involved in an accident (automobile, coach, train, aircraft ...).

Such shears or separators, as emerges especially from FR-A-2 623 738 or EP-A 409 753, are constituted by two blades or arms which are articulated about a common pin and which are mounted on a fork joint which is securely fixed to the body of a ram, the opening and closing of the said blades or arms during the cutting or separating operation being brought about by means of a system of links controlled directly by the rod of the said ram.

DESCRIPTION OF THE PRIOR ART

Currently, the power to such tools is obtained from an independent source, which makes them poorly adapted when it is desired to use them in zones of difficult access. Moreover, such devices are generally designed in such a manner as to exert their action in a specified direction, either between the two active members during the bringing together of the latter (shears), or when the two active members are moving away from each other (in the case of a separator).

Consequently, for a very long time there has been the problem of being able to achieve such works by means of a self-contained multifunctional tool.

Although numerous proposals have been made to date in order to produce tools comprising an electric motor powered by a battery which is integrated into the body of the tool (drill, saw, knife, even a crimping tool), as emerges especially from the following documents: EP-235 403, EP 389 716, FR-A-2 644 383 and EP-0 274 710 (this latter document corresponding to U.S. Pat. No. 4,890,474), all the proposed solutions do not, however, permit having an assembly which is able to function in a reversible manner while having the same efficiency in the two working directions.

SUMMARY OF THE INVENTION

There has now been found, this being the subject of the present invention, an improvement brought to such self-contained tools whose active member is controlled by an electric motor powered by a battery which is integrated into the body of the tool, and which permits this problem to be solved, the efficiency of the two blades or arms constituting the active member being similar both in the bringing together of the two arms and in their moving apart, and which permits the said tool to be used equally well as a traditional pair of shears and as a separator.

In a general manner, the device in accordance with the invention is in the form of an assembly comprising a hydraulic ram whose rod activates an actual tool constituted by two blades (or arms) which are articulated about a common pin and which are mounted on a fork joint which is securely fixed to the body of the ram, the opening and closing of the said blades being brought about by means of a system of links controlled directly by the rod of the ram, and it is characterised in that the control of the bringing together and the moving apart of the said blades is obtained by means of an assembly which is integrated into the body of the tool, the said assembly comprising an electric motor powered by a battery, and which drives means allowing the compressing of a fluid under pressure contained within a leaktight chamber, a flexible membrane being arranged in the said chamber in order to compensate for differences in the volume of the fluid within this chamber and to avoid the formation of a vacuum when the said fluid is moved in order to activate the tool, the said compressed fluid being transferred by means of a directional control valve and feeder assembly within a reversible circuit allowing it to act equally on the two faces of the piston controlling the rod of the ram activating the two blades or arms forming the tool, which permits having an assembly operating in a reversible manner while having the same efficiency in both working directions (opening and closing of the blades).

According to a preferred embodiment in accordance with the invention:

the feeder assembly is constituted by a sliding casing comprising circuits permitting the transfer of the fluid under pressure coming through an axial duct connected to the pump, either through a supply duct allowing action against the face of the piston in order to push it back, which results in the closing of the active members, or through a duct opening opposite a channel which is coaxial with the axis of the piston, which thus permits action on the face of the said piston, tending thus to move the two active elements apart from one another;

the drive motor is arranged in the axis of the hydraulic ram controlling the blades of the tool, the power battery being, itself, arranged laterally with respect to the aforementioned members, which allows a perfectly balanced assembly to be obtained.

The invention and the advantages which it brings will, however, be better understood by virtue of the exemplary embodiment given hereafter which relates to a mixed shears/separator assembly achieved in accordance with the invention and which is illustrated by the appended diagrams in which:

Description of a Preferred Embodiment

Figure 1:
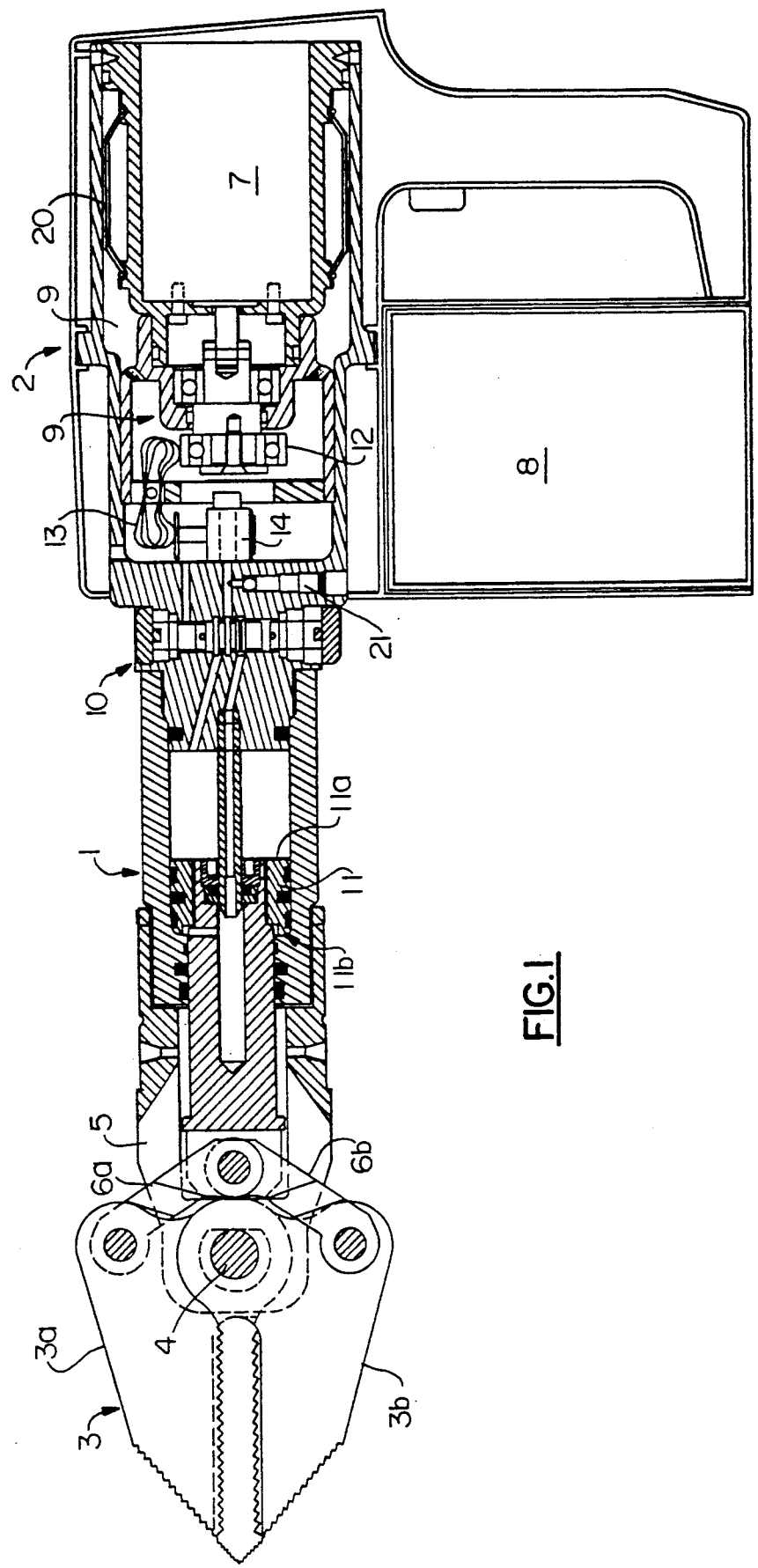
FIG. 1 illustrates the position of the active element acting as shears (closed position)

If reference is made to the appended diagrams, the self-contained multifunctional tool, permitting equally good use both as shears and as a separator, is in the form of an assembly comprising a hydraulic ram designated by the general reference (1) whose rod assembly (2) activates the actual tool (3) constituted by two blades or arms (3a, 3b) which are articulated about a common pin (4) and mounted on a fork joint (5) which is securely fixed to the body of the ram, the opening and closing of the said blades (3a, 3b) being brought about by means of a system of links (6a, 6b) controlled directly by the rod assembly (2) of the ram (1).

In accordance with the invention, and as will emerge from the appended figures, the control of the opening and closing of the blades (3a, 3b) is obtained by means of an assembly, designated by the general reference (2), which is mounted directly on the body of the ram (1) and which permits, as will be seen in the following part of the description, the piston of the ram to move with equal force in one direction or in the other in order to control the moving apart and the bringing together of the blades (3a, 3b). In order to do this, the said assembly is constituted essentially by an electric motor (7) powered by a battery (8) integrated into the housing of the tool. For example, a twelve volt direct current motor will be used. The output shaft of this motor (7) (associated or not with a reduction gear) permits the control of the means permitting the compression of a fluid under pressure arranged in a leaktight chamber (9). A feeder system (10) is associated with the aforementioned elements in order to supply a reversible circuit permitting the said fluid under pressure to be made to act with equal force on the two faces (11a) or (11b) of the piston (11) of the ram (1).

Figure 2:
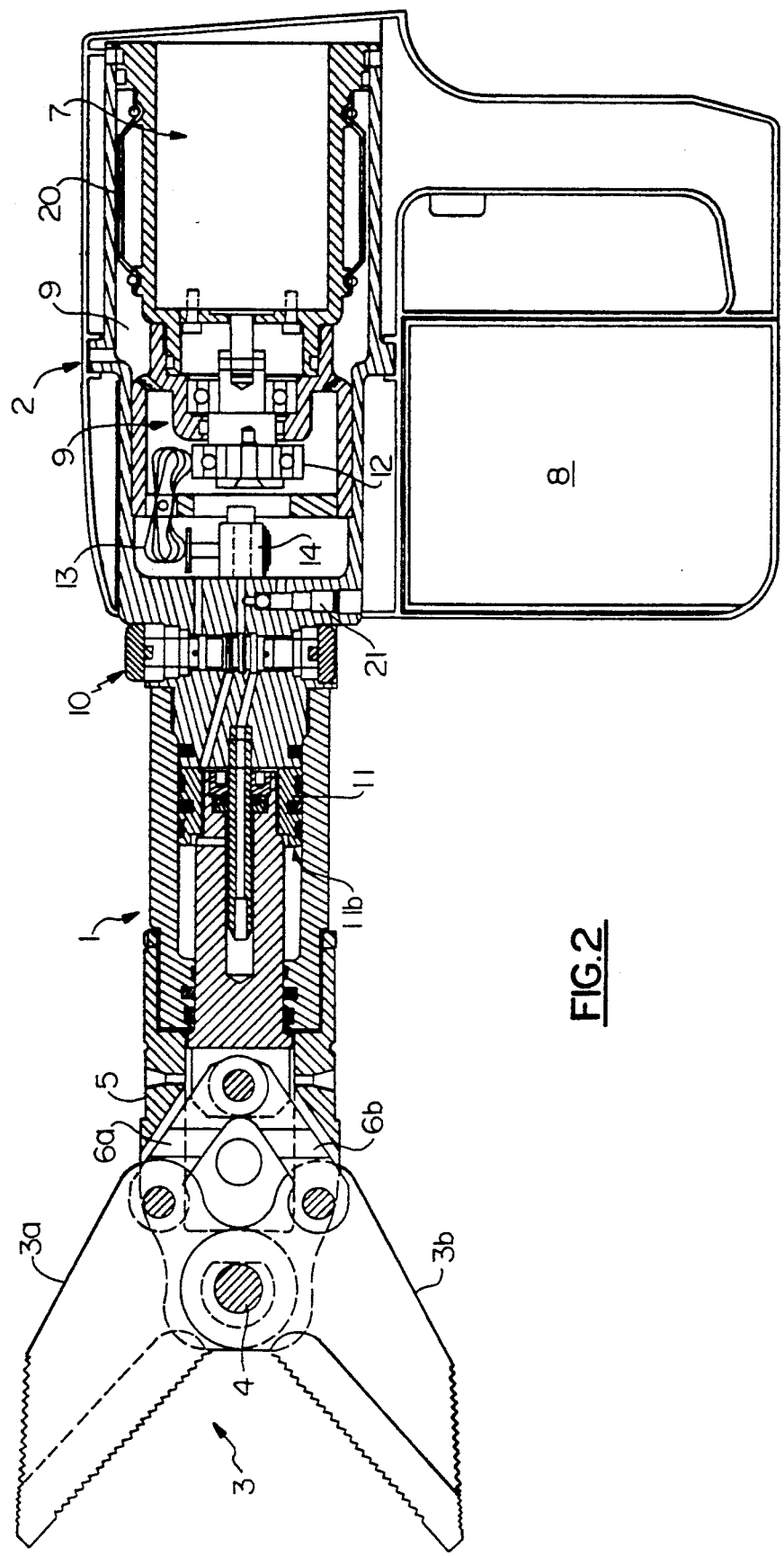
FIG. 2 is a similar view illustrating the position of the active element in the open position (separator function)
Figure 3:
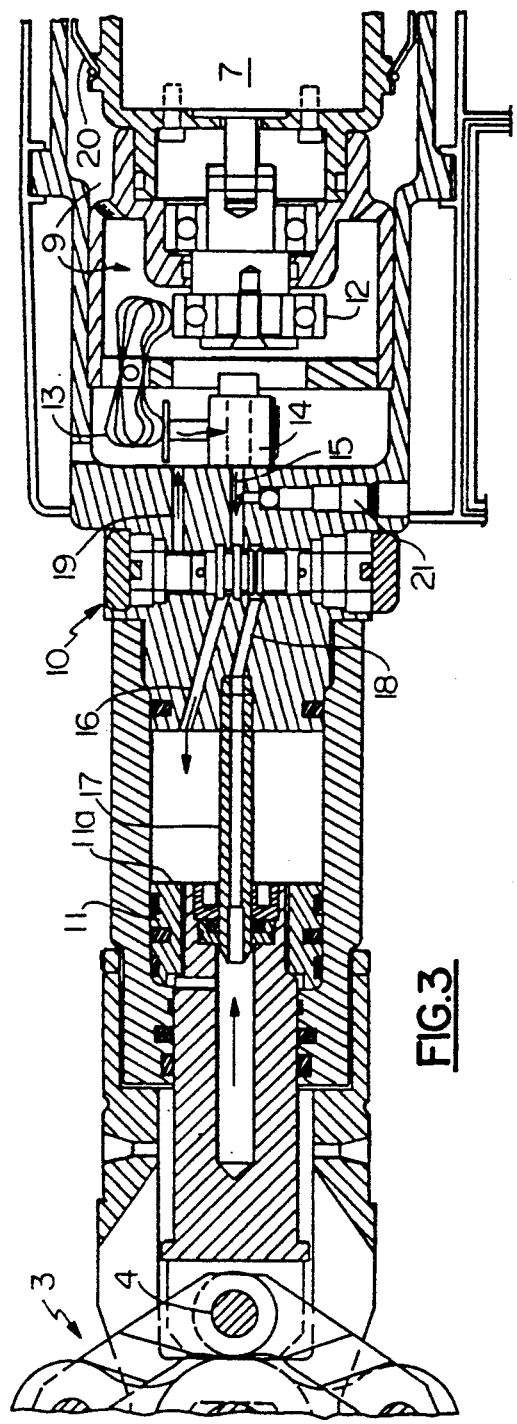
FIGS. 3 and 4 are enlarged views showing in greater detail the manner in which the hydraulic control is achieved which permits the respective positions of the tool represented in FIGS. 1 and 2 to be obtained.

The assembly for compressing the fluid is constituted essentially by an eccentric (12) driven directly by the output shaft of the motor (7), which eccentric controls a rocking element (13) which acts on a pump (14) permitting the fluid under pressure to be sent into a central axial duct (15). Opposite the outlet of this supply duct (15) is arranged the actual directional control valve and feeder assembly (10). Such a feeder assembly is constituted by a sliding casing comprising circuits permitting the transfer of fluid under pressure coming through an axial duct (15) connected to the said pump (14), either through a supply duct (16) allowing action against the face (11a) of the piston (11), in order to push it back (the position represented in FIGS. 1 and 3 ), which results in the closing of the active members (3), or through a duct (18) opening opposite a channel (17) which is coaxial with the axis of the piston, which thus permits action on the face (11b) of the said piston (11) (the position represented in FIG. 4.), tending thus to move the two active elements (3a, 3b) apart from one another (FIG. 2).

Moreover, in order to compensate for differences in the volume of fluid within the chamber, a flexible membrane (20) is arranged in the said chamber and thus makes it possible to avoid the formation of a vacuum when the fluid is moved in order to activate the tool. Finally, a pressure limiter (21) is associated with the axial duct (15) and ensures total safety of the operation of the assembly.

In the first mode of operation (FIGS. 1 and 3), the return of the fluid which was contained within the chamber of the piston is carried out through the axial duct (17), the duct (18) and a return duct (19) opening within the chamber (9). In the second case (operation of the tool in the separated position (FIGS. 2 and 4)), the return of the fluid contained within the chamber of the piston is carried out through the duct (16) and through the return duct (19) within the chamber (9). Thus a perfectly reversible control circuit is obtained which permits having actions of high intensity which are equal in force both in the moving apart and in the bringing together of the blades which constitute the active part of the tool.

Thus, as emerges from the appended figures, preferably, the drive motor (7) (possibly associated with a reduction gear), is aligned with the axis of the hydraulic ram controlling the blades of the tool, the power battery being, itself, arranged laterally with respect to the aforementioned assembly, thus permitting a compact balanced tool to be obtained. Moreover, if, in order to compress the fluid, a system with a rocking lever (13) having two arms of equal length is used, it could be possible to obtain a reduction in the leverage by offsetting the pivot pin of the said lever (13) with respect to its length.

Figure 4:
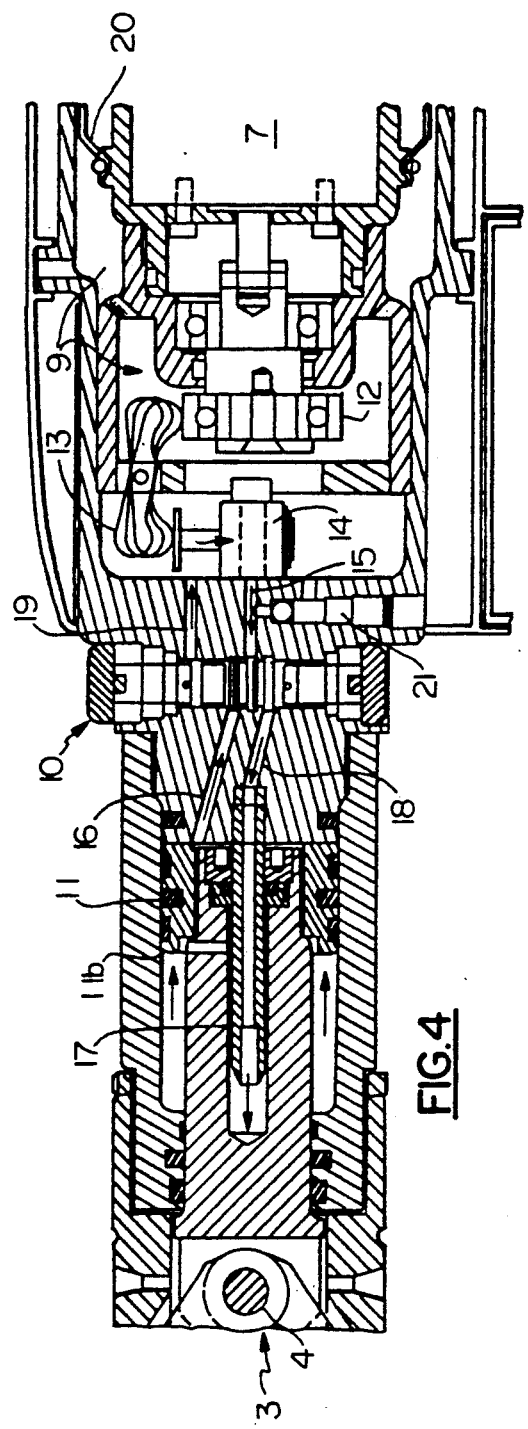

Such an assembly, which is of particularly simple design, exhibits a great efficiency and permits a perfectly reversible action of the tool (3) to be obtained, permitting equally good use thereof both as shears (FIGS. 1 and 2) and as a separator (FIGS. 2 and 4).

The present invention is particularly adapted for achieving portable tools allowing intervention on any site. Moreover, it is evident that producing similar hydraulically controlled self-contained tools where the active member may have a different structure, does not depart from the scope of the invention. Thus producing punches, cable cutters etc could be envisaged.

I claim:

1. A hydraulically controlled self-contained multi-functional tool of the type having a hydraulic ram portion, a rod assembly portion, and an active tool member constituted by two blades which are articulated about a common pin and which are mounted on a fork joint that is securely fixed to the ram portion of the tool, the opening and closing of the blades being achieved by a system of links controlled by the rod assembly of the tool, the rod assembly being of the type having a leak-tight chamber containing a fluid and an electric motor partially surrounded by the chamber, the motor being powered by a battery and connected to drive means for compressing the fluid contained within the leak-tight chamber; the improvement comprising:

flexible membrane means being arranged in the leak-tight chamber around the electric motor for compensating for volume differences of the fluid in the chamber and for avoiding the formation of a vacuum within the chamber when fluid is moved to activate the blades of the tool;

a single piston having a first face and a second face contained within a cylinder that is positioned within the ram portion of the tool, said piston being connected to the system of links that is connected to the blades of the tool;

a closed reversible fluid circuit fluidly connecting the leak-tight chamber to the first and second faces of said single piston; and a directional control and feeder valve contained within said closed reversible fluid circuit that allows compressed fluid from the leak-tight chamber to be directed with equal force against either the first face of said single piston thereby closing the blades of the tool or the second face of said single piston thereby opening the blades of the tool.

2. The multi-functional tool according to claim 1 wherein said drive means includes:

an eccentric member connected to the electric motor and rotated by the motor when electric current is supplied to the motor from from the battery;

a rocking lever having a first end, a second end, and being secured along its middle section to the rod assembly by a pin, the first end of said rocking lever being positioned to rest against said eccentric member so that when said eccentric member rotates, each end of said rocking lever moves back and forth along an arc length segment defined by the distance from the center of the pin securing the lever and each end thereof; and a pump to compress the fluid in the leak-tight chamber, said pump being activated by the movement of the second end of said rocking lever.

3. The multi-functional tool according to claim 2 wherein said closed reversible fluid circuit includes:
   a first supply duct fluidly connecting said pump of said drive means to said directional control and feeder valve;
   a second supply duct fluidly connecting the feeder valve to the first face of said single piston;
   a third supply duct fluidly connecting the feeder valve to the second face of said single piston; and
   a return duct fluidly connecting the feeder valve to the leak-tight chamber.

4. The multi-functional tool according to claim 3 wherein said directional control and feeder valve includes a sliding casing positioned around the exterior of the ram portion of the tool, the casing having circuit segments that connect said first supply duct to either said second supply duct so that pressurized fluid can act on the first face of said single piston thereby closing the blades of the tool or to said third supply duct so that pressurized fluid can act on the second face of said single piston thereby opening the blades of the tool.

5. The multi-functional tool according to claim 1 wherein the electric motor, said ram portion of the tool, and said single piston have a common longitudinal center axis and the battery has a center of gravity positioned a predetermined distance away from said longitudinal center axis so that the weight of the tool is counter-balanced by the weight of the battery.

* * * * *